(12) United States Patent
Kröling (10) Patent No.: US 10,809,398 B2
(45) Date of Patent: Oct. 20, 2020

(54) CONTINUOUS RESONANCE MARINE VIBRATOR

(71) Applicant: PGS Geophysical AS, Oslo (NO)

(72) Inventor: Nils Gunnar Olof Kröling, Kävlinge (SE)

(73) Assignee: PGS Geophysical AS, Olso (NO)

( * ) Notice: Subject to any disclaimer, the term of this patent is extended or adjusted under 35 U.S.C. 154(b) by 348 days.

(21) Appl. No.: 15/983,918

(22) Filed: May 18, 2018

(65) Prior Publication Data

US 2018/0364376 A1   Dec. 20, 2018

Related U.S. Application Data

(60) Provisional application No. 62/519,979, filed on Jun. 15, 2017.

(51) Int. Cl.
  *G01V 1/135*  (2006.01)
  *G01V 1/145*  (2006.01)
  *G01V 1/38*   (2006.01)

(52) U.S. Cl.
  CPC .............. *G01V 1/135* (2013.01); *G01V 1/145* (2013.01); *G01V 1/38* (2013.01); *G01V 1/3808* (2013.01); *G01V 2210/127* (2013.01); *G01V 2210/1214* (2013.01)

(58) Field of Classification Search
  CPC ........ G01V 1/135; G01V 1/3808; G01V 1/38; G01V 1/145; G01V 2210/1214; G01V 2210/127
  See application file for complete search history.

(56) References Cited

U.S. PATENT DOCUMENTS

| 3,482,646 | A | | 12/1969 | Brown et al. | |
|---|---|---|---|---|---|
| 4,275,597 | A | * | 6/1981 | Quedens | A61B 8/08 600/445 |
| 4,332,017 | A | * | 5/1982 | Massa | G10K 9/10 367/142 |
| 4,469,175 | A | * | 9/1984 | Massa | E21B 43/003 166/177.2 |
| 6,230,840 | B1 | | 5/2001 | Ambs | |
| 9,389,327 | B2 | * | 7/2016 | Kroling | G01V 1/135 |

(Continued)

FOREIGN PATENT DOCUMENTS

| AU | 2018204231 A1 | * | 1/2019 | ............ G01V 1/38 |
|---|---|---|---|---|
| BR | 102018012136 A2 | * | 6/2019 | ............ G01V 1/38 |

(Continued)

OTHER PUBLICATIONS

European Search Report issued to Application No. 18177831.7 dated Mar. 15, 2019.

*Primary Examiner* — Daniel Pihulic
(74) *Attorney, Agent, or Firm* — Patterson & Sheridan, LLP (57) ABSTRACT

The disclosure herein generally relates to a device for use in marine seismic surveying. A displacement apparatus has a base and an actuated head. The actuated head is coupled to an actuation means comprising a shaft, a cam, and a motor. The cam is coupled to the shaft at a radial position from the center of the cam. A vacuum piston is optionally coupled to the actuation means. A variable resonance spring, such as an air spring, is coupled to the actuated head in order to tune the apparatus to operate in resonance at a range of frequencies.

21 Claims, 9 Drawing Sheets

(56) References Cited

U.S. PATENT DOCUMENTS

| | | | |
|---|---|---|---|
| 9,547,097 B2 | 1/2017 | Laws | |
| 9,562,982 B1 | 2/2017 | McConnell et al. | |
| 9,588,242 B2 * | 3/2017 | Kroling | F15B 15/06 |
| 10,302,783 B2 * | 5/2019 | Kroling | G01V 1/3808 |
| 2010/0039900 A1 * | 2/2010 | McAleenan | G01V 1/145 |
| | | | 367/141 |
| 2012/0081994 A1 | 4/2012 | Husom et al. | |
| 2016/0202365 A1 * | 7/2016 | Engdahl | G01V 1/3861 |
| | | | 367/142 |
| 2018/0364376 A1 * | 12/2018 | Kroling | G01V 1/145 |

FOREIGN PATENT DOCUMENTS

| | | | | |
|---|---|---|---|---|
| EP | 3009863 A2 | 4/2016 | | |
| EP | 3470883 A1 * | 4/2019 | | G01V 1/135 |
| WO | 2017035144 A1 | 3/2017 | | |

* cited by examiner

CONTINUOUS RESONANCE MARINE VIBRATOR

CROSS-REFERENCE TO RELATED APPLICATIONS

This application claims benefit of U.S. provisional patent application Ser. No. 62/519,979, filed Jun. 15, 2017, which is herein incorporated by reference.

BACKGROUND

Field

Embodiments of the present disclosure generally relate to a marine vibrator for use in marine seismic surveying.

Description of the Related Art

Seismic surveying employs sound waves propagated from a surface source to search for geological formations deep within the Earth, such as in the exploration of fossil fuel reservoirs. In marine seismic surveying, which occurs in marine environments, the source may be a surface source or a submerged source. Sound is generated from the source and directed towards the Earth's crust. Changes within the layers of the crust, such as changes in the density of formations, scatter, reflect, or change the waves as they prorogate through the strata. Some of the waves are reflected back towards the source. A measuring device, such as a transducer or a hydrophone, records the waves reflected by the various layered media within the strata. Differences in properties of the known propagated source wave and the reflected wave, for example amplitude and propagation time, are measured and analyzed to develop a geographical profile of the subsurface formations. This profile can be used to determine important geological features for the presence, composition, and physical extent of natural resource reserves.

Conventional marine surveying techniques use air guns to propagate sound waves. These air guns discharge high pressure air in frequent, short bursts to create air pockets within water which collapse to produce powerful sound waves at a regular interval. The use of air guns enables surveying to be conducted over a large area in a short amount of time. However, the source waves produced by the air guns are often produced at high levels, such as up to 240 dB re 1 µPa (pressure level relative to the reference intensity), which may cause damage to animal life within range of the source, thus causing surveyors to limit use of the air guns in the presence of various type of marine life. In recent years, there have been growing concerns for the environmental hazards associated with these air gun seismic surveys.

In order to reduce utilization of air guns, marine vibrators have become common in marine surveying. These devices are submerged below the surface of the ocean and produce high pressure, low frequency sound waves. The source waves produced by marine vibrators are produce in a manner that does not harm marine animal life. However, many marine vibrators suffer from a limited bandwidth in which they can effectively produce frequencies. Additionally, the size of the device and the complexity of components therein greatly reduce the effective life of the source. Therefore, what is needed is an improved marine vibrator.

BRIEF DESCRIPTION OF THE DRAWINGS

So that the manner in which the above recited features of the present disclosure can be understood in detail, a more particular description of the disclosure may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

The present disclosure generally relates to a device for use in marine seismic surveying. A displacement apparatus includes a base and an actuated head. The actuated head is coupled to an actuation means comprising a shaft, a cam, and a motor. The cam is coupled to the shaft at a radial position from the center of the cam. A vacuum piston is optionally coupled to the actuation means. A variable resonance spring, such as an air spring, is coupled to the actuated head in order to tune the apparatus to operate in resonance at a range of frequencies.

Figure 1:
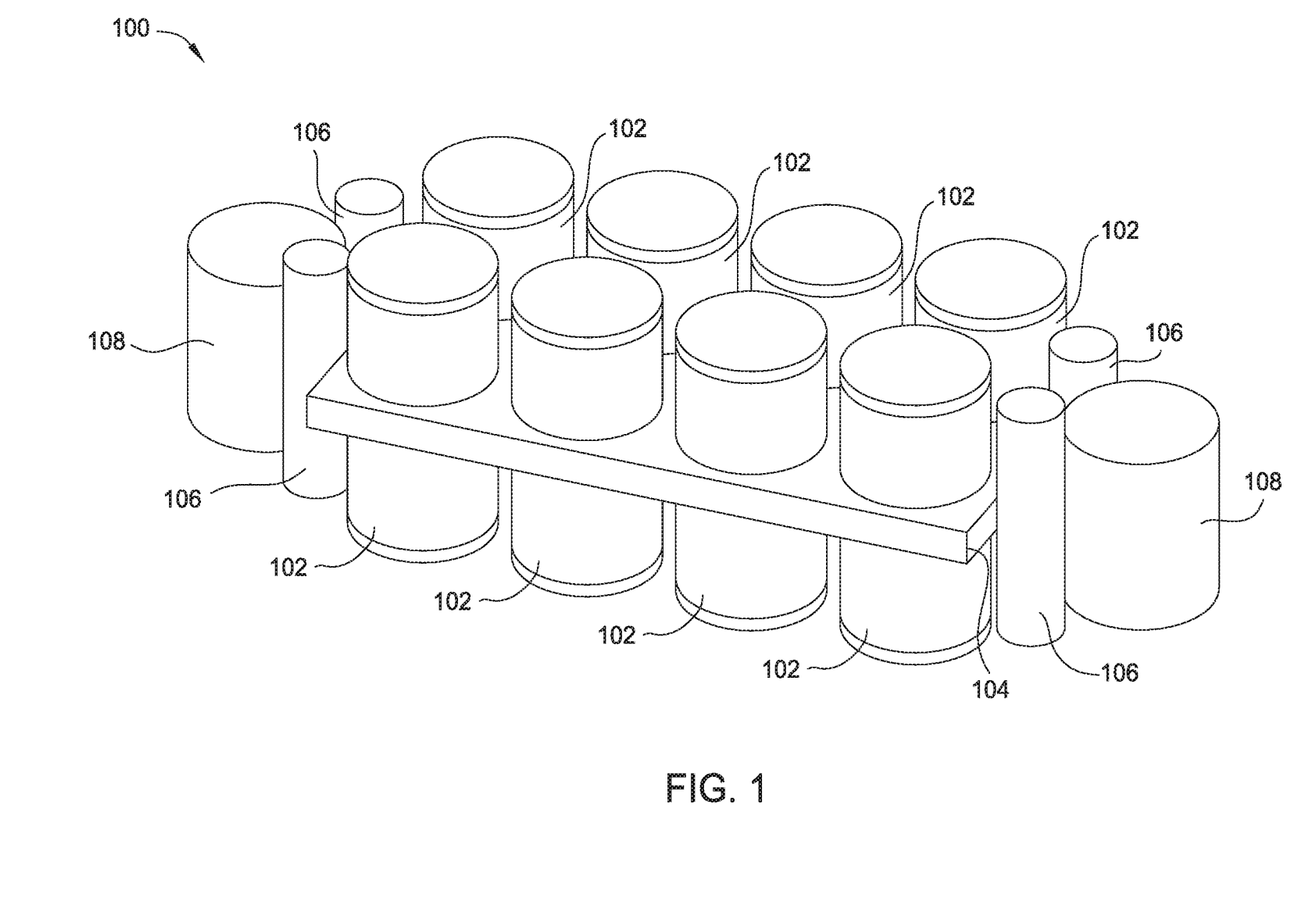
FIG. 1 is an arrangement of an exemplary marine vibrator.

FIG. 1 is a perspective view of an exemplary marine vibrator assembly 100 according to one embodiment. In the embodiment of FIG. 1, the marine vibrator assembly 100 includes a plurality of pistons 102, also referred to herein as oscillators, coupled to a body 104. In FIG. 1, sixteen pistons 102 are coupled to the body 104 wherein eight of the pistons 102 are coupled to an upper surface of the body 104 and eight of the pistons 102 are coupled to a lower surface of the body 104. However, the marine vibrator assembly 100 is not limited to this configuration. Any number or arrangement of pistons may be used. In addition, the body 104 may have any useful configuration. Generally, the marine vibrator assembly 100 is configured to have a compact size and the number of pistons 102 is selected to provide desired energy source properties.

The marine vibrator assembly 100, including the body 104 and pistons 102 coupled thereto, may be disposed within a housing (not shown). The housing surrounds the marine vibrator assembly 100 to provide a streamlined flow profile while the marine vibrator is deployed in surveying operations, for example, as being towed behind a tow vessel. The housing is generally adapted to allow fluid communication between an internal volume of the housing, where the marine vibrator assembly 100 is disposed, and the environment external to the housing. When the marine vibrator assembly 100 is deployed within the housing in a surveying operation, an ambient fluid, generally sea water, fills the housing and surrounds the marine vibrator assembly 100 to contact the outer surfaces of the pistons 102 and the body 104. The pistons 102 are actuated at a frequency, such as 4 Hertz, to generate a wave or pulse within the fluid surrounding the marine vibrator assembly 100. The wave or pulse propagates through the fluid toward the seafloor wherein the propagated wave is used to detect geological formations.

The marine vibrator assembly 100 may further have auxiliary tanks 106. The auxiliary tanks 106 may be coupled to, and supported by, the body 104. Here, four auxiliary tanks 106 are shown disposed at opposing ends of the body 104. It should be noted that fewer auxiliary tanks 106, such as two, one, or even zero, or more auxiliary tanks, such as eight, twelve, sixteen, or even eighteen, in any suitable configuration may be utilized. The auxiliary tanks 106 store a fluid, such as air or nitrogen, which is typically compressed and may, in some cases, be liquefied. In certain embodiments, the fluid stored within the auxiliary tanks 106 is used to pressurize an internal volume of the pistons 102. The body 104 has conduits (not shown) which allow the auxiliary tanks 106 to fluidly communicate with the internal volume of the pistons 102. The conduits may further include valves (not shown) disposed therein to selectively allow passage of a gas therethrough. In certain embodiments, the body 104 is hollow and configured to house components, such as electrical wiring, fluid conduits, or piston actuation assemblies, therein. In other embodiments, the body 104 may have a plurality of divided compartments to define individual volumes. In still further embodiments, the body 104 may be a solid member, such as a plate.

Two pods 108 may be disposed on the body 104, one at each opposing end thereof. The pods 108 may have a hollow interior wherein components for the marine vibrator assembly 100 are stored. For example, a first pod 108 may store a controller (not shown) which is configured to control the actuation of the pistons 102 and a second pod 108 may store a vacuum pump (not shown). Any components may be stored within the pods 108. Further, the number of pods may increase or decrease in relation to, for example, the number of components to be stored.

FIG. 1 shows the components of the marine vibrator assembly 100, such as pistons 102, auxiliary tanks 106, and pods 108, with simplified shapes. One of ordinary skill in the art will understand that any shapes may be utilized for the components of the marine vibrator assembly 100. For example, the tanks 106 may have domed hemispherical ends, which can make such tanks, commonly referred to as "bullets," capable of withstanding both internal and external pressures generated by the operation of the marine vibrator assembly 100. Other shapes of the components, such as spherical, are also contemplated. Further, the materials of construction may be any material suitable to withstand the pressure generated by the fluid or selected to prevent degradation from the operating environment. Some exemplary materials included metallic materials, for example aluminum, stainless steel, or cast iron, and plastic materials, such as polymers or glass reinforced plastic (GRP).

Figure 2:
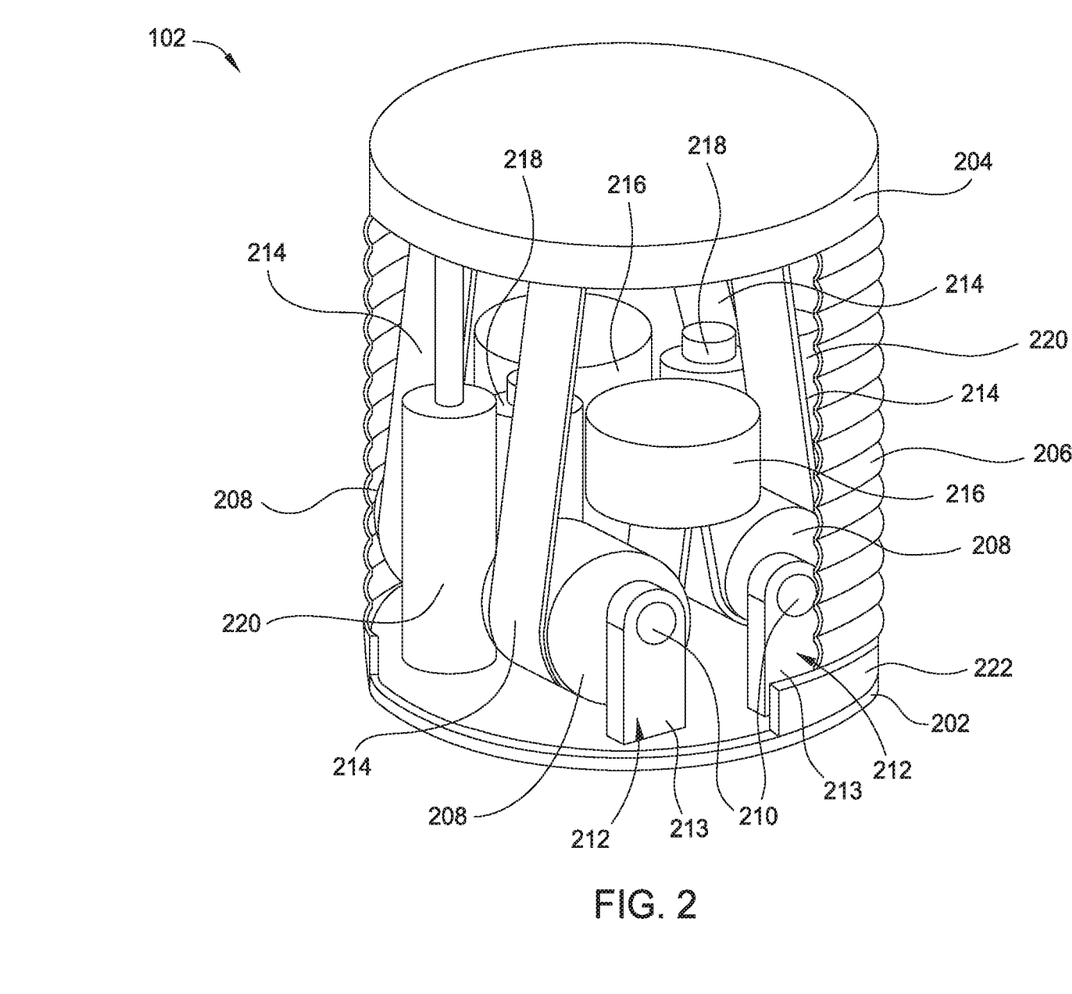
FIG. 2 is a perspective view, partial cutaway of an arrangement of an exemplary piston according to certain embodiments.

FIG. 2 is a perspective view of a piston 102 according to one embodiment. The piston 102 has a base 202, a head 204, and a seal 206 disposed between the base 202 and the head 204. Here, the base 202 and seal 206 are partially cut away to show internal components of the piston 102. The base 202 generally forms a mounting surface for components thereon. The base 202, the head 204, and the seal 206 cooperate to define an airtight volume within the piston 102. The base 202 and head 204 are configured to withstand pressures created by operation of the piston 102, such as, by the fluid surrounding the piston 102 when it is deployed at depth. In certain embodiments, the base 202 and the head 204 are formed from a metallic material such as steel. However, other materials, such as plastics or composites, are contemplated. Additionally, other shapes of the head 204 and base 202, such as square or ovoid, are contemplated.

In operation, the head 204 moves in a direction substantially perpendicular to the base 202. The seal 206 generally includes a flexible material capable of withstanding a high number of actuation cycles of the piston 102. The seal 206 is designed to withstand both an external pressure from the fluid surrounding the piston 102 and an internal pressure (within the piston 102) which is discussed in detail below. The seal 206 is coupled to the base 202 at a first end and the head 204 at a second end. The seal 206 may be coupled to the head 204 and base 202 by any means capable of withstanding the operating environment and stresses produced by the piston 102. In one configuration, the seal 206 is coupled by a bond to a lip disposed on a mating body. In another configuration, a ledge (not shown) is provided on an external surface of the mating body. The seal overlaps the ledge and is compressed thereto by a mating ledge disposed on a clamp ring (not shown). In further configurations, the seal is bonded directed to the coupling body. In still further configurations, a flange is used. Any means of coupling the seal 206 to a mating body, such as head 204 or base 202, may be utilized. In FIG. 2, a ring 222 extends from the base 202 toward the head 204 in an axial direction. The ring 222, shown in partial cutaway in FIG. 2, extends around the circumference of the base and provides an attachment point for the seal 206. The ring 222 is connected to the base 202, for example, by welding, or integral with the base 202. The seal 206 attaches to an interior surface of the ring 222, for example using adhesive and/or fasteners such as bolts. Alternately, the ring 222 may be a separate piece removable from the base 202, and the seal 206 may be captured between the ring 222 and the base 202, for example by an external clamp (not shown), which can provide sealing pressure. The ring 222 could also be fastened to the base 202 using fasteners, such as bolts, to pass through the ring 222 and the base 202 in an axial direction.

Actuation mechanisms are disposed within the piston 102 in the volume defined by base 202, head 204, and seal 206. Cams 208, here four cams 208, are disposed within piston 102. Other numbers of cams 208, for example, one, two, three or even eight, may be utilized. Each cam 208 is coupled to a shaft 210 which is supported by a bearing assembly 212 at each end of the shaft 210. The cams 208 coupled to the shaft 210 form a cam assembly. Each bearing assembly 212 has a plurality of bearings (not shown) in a housing 213 attached to the base 202. A bearing assembly 212 supports each shaft 210 at either end thereof. In certain embodiments, the bearings are roller bearings. In further embodiments, the bearings may be ball bearings. Any type of bearing suitable to withstand loads imposed on the shaft 210 may be utilized. In FIG. 2, two cams 208 share a common shaft 210. That is, a first pair of the cams 208 is coupled to a first shaft 210 and a second pair of cams 208 is coupled to a second shaft 210. Belts 214, here four belts 214, contact the outer cylindrical surface of the cams 208. In certain embodiments, the cams 208 and belts 214 are toothed, and the toothed belts 214 mate with the toothed cams 208. Other devices, such as steel cables or chains, may be used in place of the belts 214 to form a transfer member. Additionally, combinations of these devices may be used.

Here, the cams 208 are illustrated having a circular cross-section. However, the cams 208 may be different shapes, including eccentric lobes, and further have a toothed or roughened surface for gripping the belts 214. The cams 208 may also be a smooth surfaces, toothed wheels, gears, pullies, or sheaves, among other devices, which are capable of providing a force or grip to the belts 214 and prevent dislocation or slippage thereof when engaged with a face of the cams 208. At a first end, the belts 214 are coupled to the head 204 at an inner surface (not shown). At a second end, the belts 214 are coupled to a vacuum piston 216. Two vacuum pistons 216 are shown in FIG. 2. Each vacuum piston 216 couples to two of the four belts 214. Resonance springs 220 are disposed between, and fixed to, the head 204 and the base 202. At a first end, the resonance spring 220 is fixed to the base 202. At a second end, the piston (not indicated) of the resonance spring 220 is fixed to the head 204. A motor 218 is coupled to each shaft 210 and rotates the shaft 210 about its axis. When the shaft 210 rotates, a torque about shaft 210 is imposed onto the cams 208 coupled thereto. A detailed discussion of the actuation of the piston 102 is discussed below in reference to FIGS. 4A and 4B.

Figure 3A:
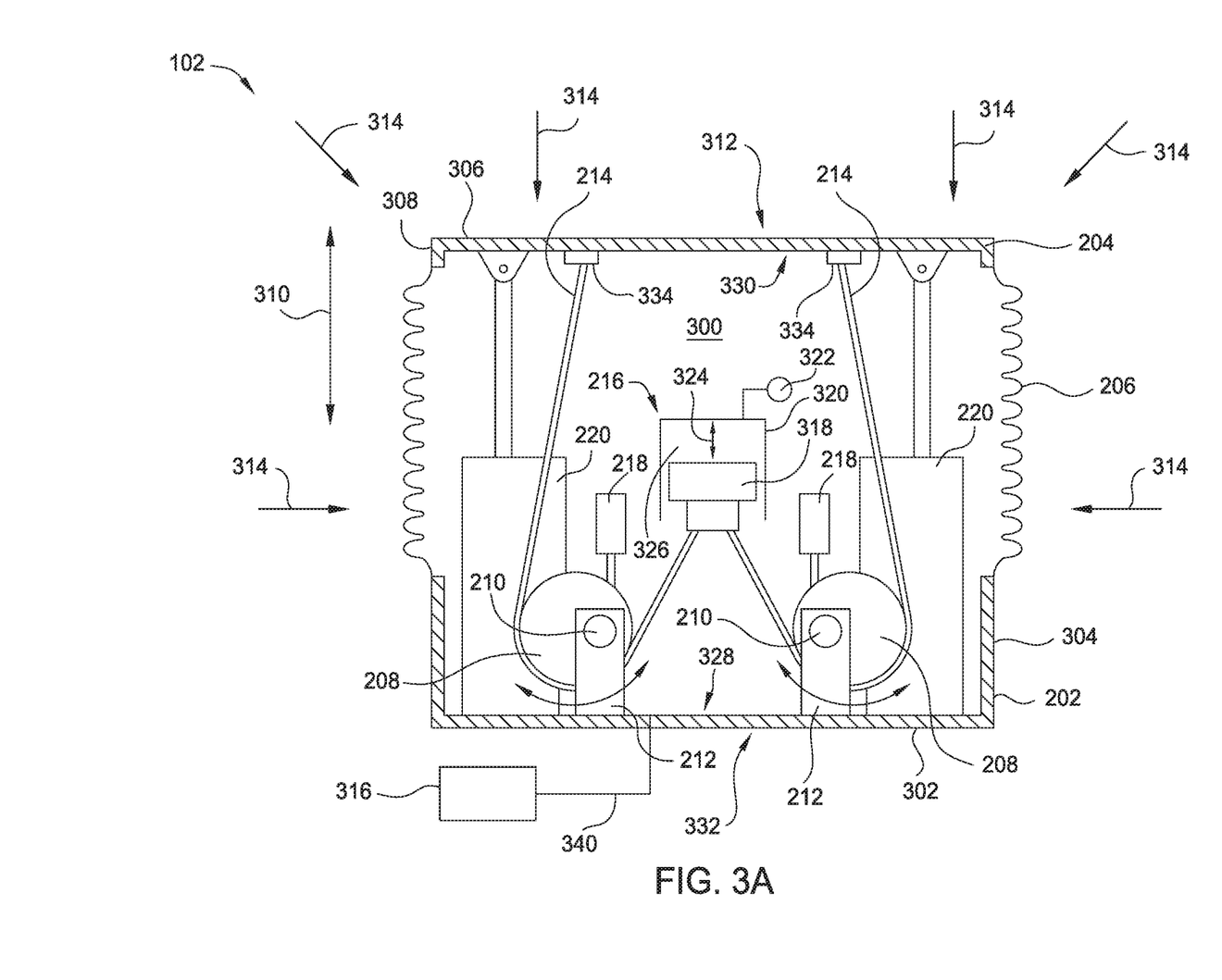
FIG. 3A and FIG. 3B are schematic arrangements of exemplary pistons according to certain embodiments.

FIG. 3A is a cross-sectional schematic arrangement of an exemplary piston 102. In FIG. 3A, common components shared with FIG. 2 are indicated with identical reference numerals. In FIG. 3A, the base 202 has a discus horizontal portion 302 ("horizontal" here being defined by a basis plane of the piston 102 and not by reference to the direction of gravitational force) having an inner surface 328 (i.e., facing the interior of the piston 102) and an outer surface 332 (i.e., facing the exterior of the piston 102) opposite of the inner surface 328. A cylindrical lip 304 is disposed at the outer periphery of the horizontal portion 302 and extends from the inner surface 328. Disposed opposite of the base 202, head 204 similarly has a discus horizontal portion 306 having an outer surface 312 and an inner surface 330. A cylindrical lip 308 disposed at the periphery and extends from the inner surface 330. The diameters of the head 204 and the base 202 are generally equal. The seal 206 is coupled to the lips 304, 308 at an outer surface which partially defines the internal volume 300 of the piston 102. It is also contemplated that the seal 206 could couple to an inner surface of the lips 304, 308. As discussed above, any means of coupling the seal 206 to the base 202 and the head 204 may be used. In certain embodiments, the lips 304, 308 are removed and the seal 206 couples to the discus horizontal portions 306, 302. The seal 206 may be coupled to the head 204 and the base 202 at any suitable location.

As the marine vibrator assembly 100 is deployed at depth for surveying operations, the fluid thereabout applies a hydrostatic pressure, increasing with depth, onto the outer surfaces of the marine vibrator assembly 100. The hydrostatic pressure presses against the piston 102 as indicated by arrows 314. Since the internal volume 300 is isolated from the external environment, the pressures in the internal volume 300 and the area surrounding the piston 102 are not necessarily equal. In certain situations, a pressure differential exists between the internal volume 300 and the environment outside of the piston 102 across the outer boundaries thereof. If the pressure within the internal volume 300 is less than the hydrostatic pressure, the pressure differential produces a compressive force onto the piston 102. That is, the pressure differential creates a force in a direction from the high pressure outside of the piston 102 towards the lower pressure in the inner volume 300. At certain operating depth ranges, such as from 1 meter to 130 meters or more, the hydrostatic pressure enacted on the marine vibrator assembly 100 may be, for example, 1 bar, 5 bar, 14 bar, or even higher.

In order to maintain a pressure within the internal volume 300 greater than a pressure external of the piston 102, the piston 102 may be coupled to a pressure source 316. In certain embodiments, the pressure source 316 may be the auxiliary tanks 106 of FIG. 1. In other embodiments, the pressure source 316 may be a surface member, such as a pressurized tank or compressor. The pressure source 316 is in fluid communication with the internal volume 300 by conduits 340. The pressure source 316 provides or removes a pressure medium, such as a gas, to the internal volume 300. The pressure created by the pressure source 316 in the internal volume 300 resists the hydrostatic pressure. In certain configurations, the pressure source 316 is adapted to maintain a pressure within the internal volume 300 that is greater than the hydrostatic pressure. For example, as the marine vibrator is deployed to increased depths, the pressure source 316 may increase the pressure within the internal volume 300 to resist the increased hydrostatic pressure and prevent unwanted compression of the piston 102 due to external force.

Cams 208 are again shown mounted to shafts 210. The shafts 210 are coupled to cams 208 at a location displaced from the center of the cams 208. In this arrangement, a point on the outer circumference of the cam 208 traverses an arc (not shown) as it rotates about the shaft 210. Cams 208, and shafts 210 coupled thereto, generally rotate 180 degrees about the shaft 210. The degree of rotation may be increased or decreased in relation to the desired stroke of the piston 102 or in relation to the loads produced thereby.

In the embodiment of FIG. 3A, the motors 218 are coupled to the shafts 210, and are, for example, linear motors. The motors are actuated or stroked in order to create rotation on the shafts 210. As the shafts 210 rotate, cams 208 coupled thereto rotate about the shafts 210. The rotation of the cams 208 induces a tension in the belts 214. Since the belts 214 are coupled to the head 204, such as at connection points 334, the belts 214 apply a compressive (inward) force to the head 204 towards the base 202. That is, actuation of the motor 218 induces a movement of the head 204 in a vertical direction 310 which is parallel to a central axis of the piston 102. Movement of the head 204 also induces movement of the seal 206 coupled thereto. Any distance displaced by the head 204 is similarly displaced by a portion of the seal 206. As the head 204 moves toward the base 202, the internal volume 300 is decreased. Additionally, as the head 204 moves toward the base 202, fluid external to the piston 102 is displaced.

As discussed above, the seal 206, in cooperation with the head 204 and base 202, creates an airtight seal around the internal volume 300. Therefore, when the head 204 moves toward the base 202 and decreases the internal volume 300, the gases contained within the internal volume 300 are compressed. As the internal volume 300 decreases, the pressure in the internal volume 300 increases and also increases the force needed to move the head 204. That is, as the head 204 moves to base 202, the required force to move the head 204 increases as the distance between the head 204 and base 202 decreases due to the compression of the gases therein. The movement of the head 204 to the base 202 is herein referred to as compressing the piston 102. The cycle of completely compressing the piston and returning to the starting, neutral positon is one "stroke" of the piston 102. At the "bottom" of the stroke, which is the point when the distance between the head 204 and the base 202 is minimized, and accordingly the internal volume 300 is minimized, the force generated by the compressed gas within the internal volume 300 is greatest. That is, the force created by the compressed gas in the internal volume 300 is inversely proportional to the volume within the internal volume 300. The compressed gases within the internal volume 300 store energy. Since the pressure in the inner volume 300 is greater than the hydrostatic pressure, the compressed gas acts like a compressed spring applying an outward force (away from the base 202) to the head 204. When the head 204 is "released" at the bottom of the stroke, the stored energy pushes the head 204 away from the base 202 in a rapid motion. The outward movement of the head 204 displaces a fluid, such as water, that is in contact with the head 204, in particular the outer surface 312. This fluid displacement results in a wave that is propagated by the fluid which may be used in seismic surveying. The amount of fluid displaced depends on the surface area of the head 204 and the length of the travel of the head 204. The length of travel of the head 204 may be increased or decreased by varying the size and configuration of the components of the piston 102 such as the diameter of the cams 208, length of the belts 214, displacement of the vacuum piston 216, or the rotation angle of the shaft 210.

In certain configurations, the internal pressure acting on the head 204 to resist compression of the piston 102 requires a large force to accomplish incremental retraction of the head 204. The force to compress the gases within the internal volume 300 is generated by the motors 218 and transferred through the shaft 210-cam 208-belt 214 coupling to act on the head 204 as the piston 102 is compressed. That is, the motors 218 generate the force to move the head 204 towards the base 202. When the force needed to compress the piston 102 is large, the motors 218 must be sized accordingly. In certain applications, the size of the motors 218 is prohibitively large due to their required footprint and weight. In order to overcome these problems, the embodiments herein advantageously utilize features to create the large forces required to actuate the head 204 while maintaining a compact size of the piston 102.

Vacuum pistons 216 are disposed within the internal volume 300. Herein, "vacuum piston" refers to a piston-cylinder arrangement which operates with a lower pressure inside the cylinder than a volume external of the cylinder. In certain cases, the pressure within the vacuum piston may be a sub-atmospheric pressure (i.e., partial or full vacuum conditions). In other cases, the pressure within vacuum piston may equal to or greater than atmospheric pressure as long as the pressure within the cylinder is less than the pressure outside of the vacuum piston. In certain embodiments, such as the embodiment of FIG. 2, two vacuum pistons 216 are used. In each FIG. 3A and FIG. 3B, the vacuum piston 216 is coupled to two belts 214 at ends opposing the head 204. Therefore, when a force or tension is applied to the belts 214, it acts on both the head 204 and the vacuum piston 216. Similarly, if a force is applied onto the belts 214 by the vacuum piston 216, it will be transferred to the head 204. The vacuum piston 216 includes a piston head 318 disposed within a cylinder 320. The cylinder 320 is enclosed at a first end and open at a second end opposing the first end. At the open end of the cylinder 320, the piston head 318 is coupled to the belts 214 wherein the belts are free to move synchronously with the piston head 318 without contacting a surface of the cylinder 320. The piston head 318 travels along a path 324 defined by the cylinder 320. A seal (not shown) disposed within the piston head 318 forms an airtight seal against the cylinder 320 defining a volume 326 between the piston head 318 and a enclosed end of the cylinder 320. A vacuum source 322, such as a vacuum pump, is in fluid communication with the volume 326. The vacuum source 322 is adapted to evacuate the volume 326 which reduces the pressure therein such that the pressure within the volume 326 is less than the pressure in the internal volume 300 to create a pressure differential. As described previously, a pressure differential creates a force in a direction from the high pressure to the low pressure across a body. In operation, the vacuum source 322 lowers the pressure within the volume 326 thereby creating a pressure differential across the piston head 318 from the internal volume 300 towards the volume 326. This pressure differential applies a force to the piston head 318 which urges the piston head 318, and belts 214 coupled thereto, towards the enclosed end of the cylinder 320 along path 324. The bias of the piston head 318 creates a tension in the belts 214 which is transferred to the head 204 at connection points 334.

As is commonly known, the force created by a pressure differential is a function of the surface area and the size of the pressure differential enacted thereon. Since the piston head 318 has a large surface area, for example having a diameter of 300 mm, a small pressure differential, such as 1 bar, can generate a large force. This helps to compress the piston 102. During a stroke of the piston, the vacuum source 322 evacuates the volume 326 to bias the piston head 318 towards the enclosed end of the cylinder 320. Meanwhile, the motors 218 are actuated in order to apply a rotational movement to the shafts 210. The rotation of the shafts 210 moves the belts 214 in the same direction as the travel path of the belts 214 at the piston head 318. That is, the piston head 318 and the cams 208 cooperate to move the belts 214 in the same direction. As such, the forces applied by both the motors 218, which are transferred to the belts 214 by the cams 208, and the piston head 318 cooperate to move the head 204 towards the base 202 and compress the piston 102. At the bottom of the stroke of the piston 102, the motors 218 and the vacuum source 322 disengage in order to release the head 204 thereby generating a wave as discussed above. The synchronous use of the vacuum piston 216 with the motors 218 lessens the force required to be generated by the motors 218 in order to stroke the piston 102. Therefore, a smaller motor can be used with the embodiments herein. It should be noted that the size and number of the vacuum pistons 216 may be selected as desired to actuate the piston 102.

Figure 3B:
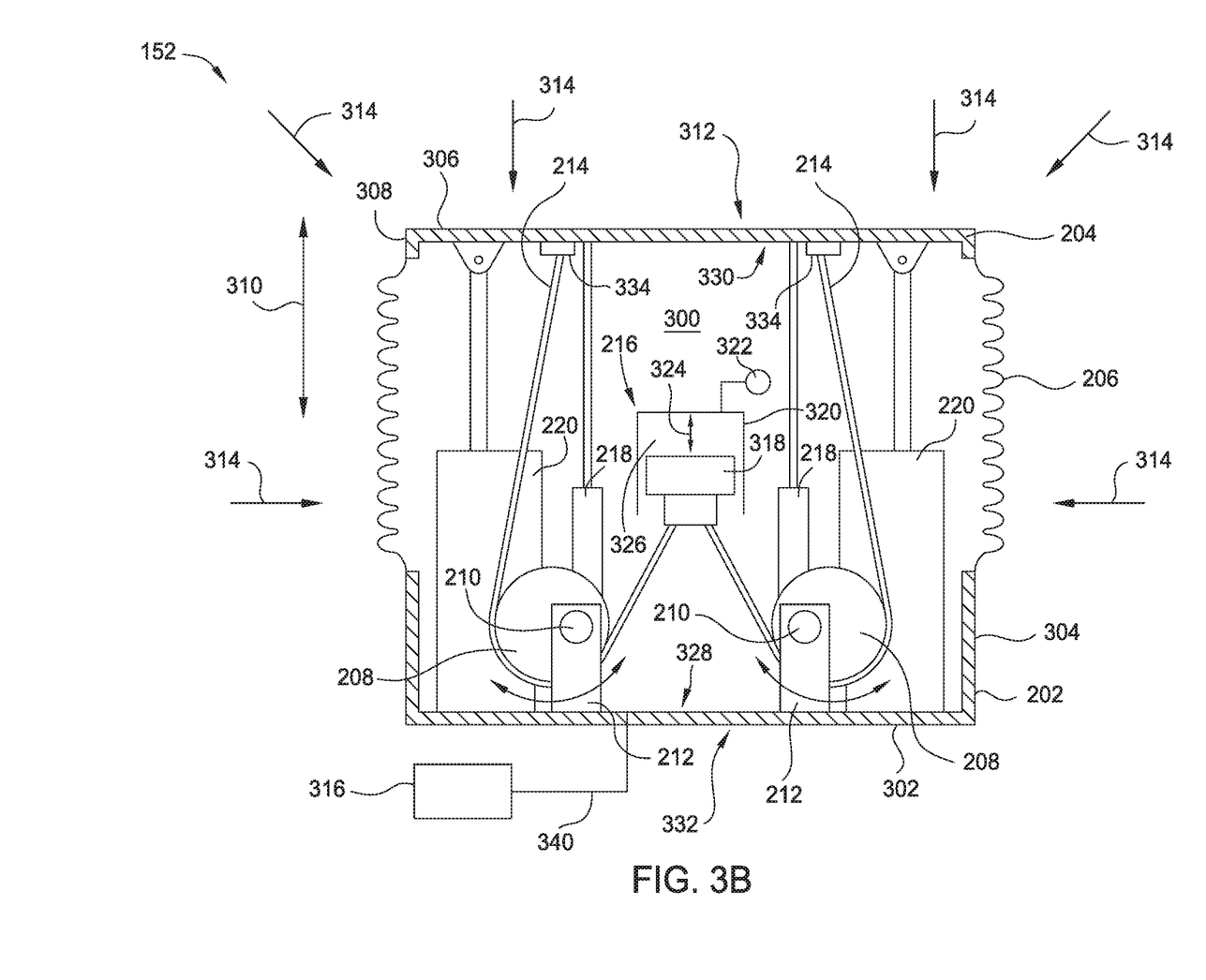

FIG. 3B is a cross-sectional schematic arrangement of another embodiment of an exemplary piston 152. The piston 152 of FIG. 3B is similar to the piston 102 of FIG. 3A except that the motors 218 are coupled directly to the head 204 and the base 202 rather than to the shafts 210. Here, the motors 218 are actuated or stroked in order to apply a force onto the piston head 104. Thus, a force applied by the motors 218 acts directly onto the head 204, in conjunction with force applied by the vacuum piston 216 through the belts 214, to actuate the piston 152. In the embodiment of FIG. 3B, a position sensor (not shown) is optionally coupled to the motors 218. The position sensor detects a location or operational positon of the motor 218 which can be directly related to a position of the head 204. Therefore, a position of the head 204 in an actuation cycle of the piston 152 can be determined through the position of the motor 218.

Figure 4A:
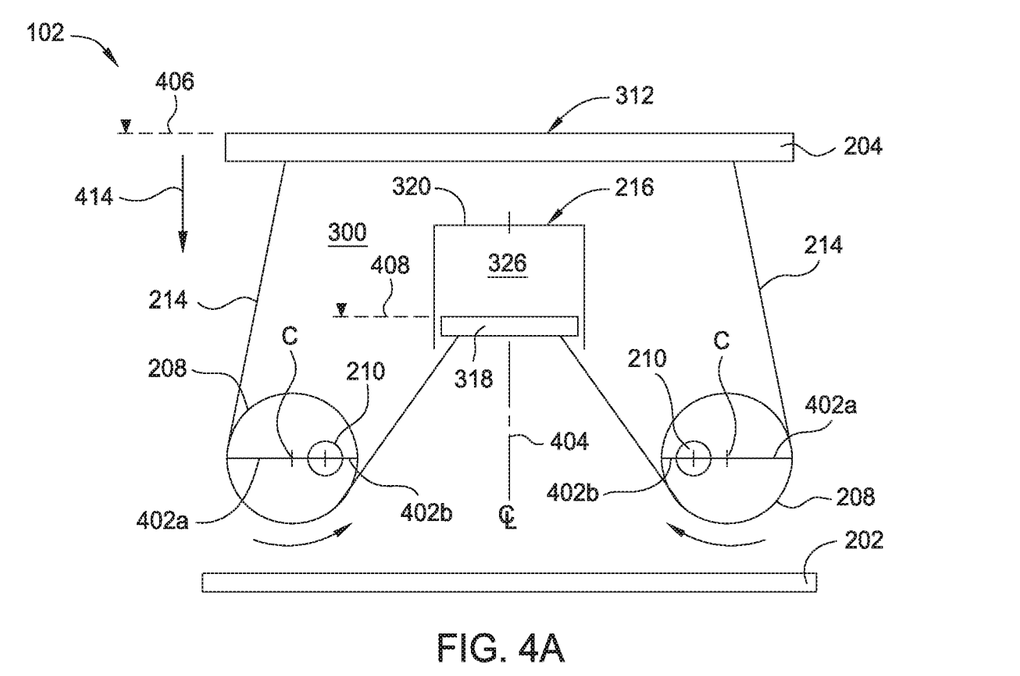
FIG. 4A and FIG. 4B are schematics of operating positions of an exemplary piston according to certain embodiments.
Figure 4B:
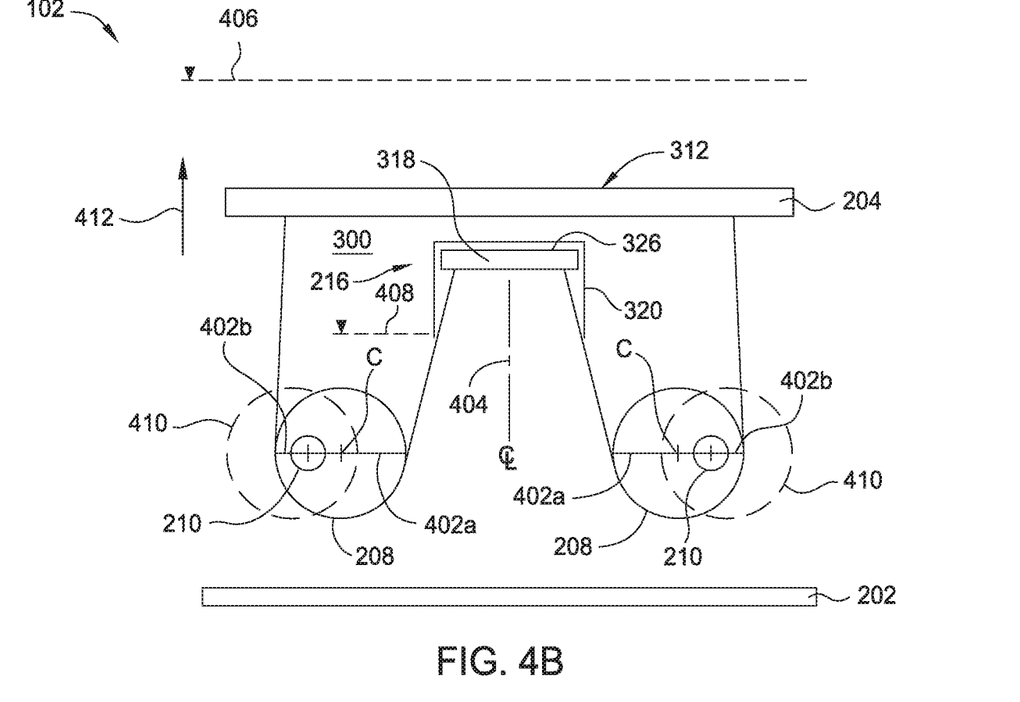

FIGS. 4A and 4B are schematic representations of the actuation of the piston 102. For clarity, only features necessary to discuss the actuation of the piston 102 are shown here. Head 204 and base 202 are shown in simplified shapes. FIG. 4A is the piston 102 at the neutral starting positon referred to as the "top" of the stroke. FIG. 4B is the piston 102 at the fully compressed position referred to as the "bottom" of the stroke. One stroke, or cycle, of the piston 102 is moving the head from the start at the top of the stroke, to the bottom of the stroke, and returning to the starting position at the top of the stroke.

In FIGS. 4A and 4B, a center C of the cams 208 is shown. The shafts 210 are coupled to the cams 208 at locations displaced from their respective centers C. A line segment 402 (made of line segments 402a, 402b) is shown across the diameters of cams 208 through the centers C and the center of the respective shafts 210. A first line segment 402a represents the portion of the line segment 402 from the circumference of the cam 208 to the center of the shaft 210 through the center C. A second line segment 402b represents the portion of the line segment 402 from the center of shaft 210 to the edge of the cam 208 that does not pass through the center C. Since the shaft is mounted at a location displaced from the center C, the line segment 402b is shorter than the line segment 402a. A rotation of the shaft 210 will generate a greater tangential force at the outer end of line segment 402a than at the outer end of line segment 402b because of the moment arm associated with line segment 402a is substantially larger. Therefore, the force applied to the belt 214 by the motor 212 is greatly increased due to the mechanical advantage provided by the offset shaft 210-cam 208 configuration. By utilizing this offset configuration, a smaller motor 212 may be utilized to stroke the piston 102 than if the shafts 210 coupled to the centers of cams 208.

At the top of the stroke shown in FIG. 4A, the line segment 402a is disposed outward of line segment 402b and away from a centerline 404 of the piston 102. When the motors 218 (FIG. 3) are actuated to rotate the shafts 210, the cams 208 rotate about the shafts 210 inwardly towards the centerline 404. Generally, the shafts 210 rotate 180 degrees but any degree of rotation necessary to actuate the piston 102 may be utilized. The shafts 210 rotate until the head 204 compresses the volume 300 a desired amount. At the bottom of the stroke shown in FIG. 4B, this position is shown wherein the cams 208, and shafts 210 coupled thereto, are rotated 180 degrees. In this configuration, the line segments 402a, 402b have inverted locations from the top of the stroke in FIG. 4A. That is, line segment 402a is disposed inward towards the centerline 404, and line segment 402b is disposed outward. In FIG. 4B, the positions of the cams 208 at the top of the stroke are shown in phantom as indicated by dashed circles 410. At the bottom of the stroke, the centers C of the cams 208 have moved to a location inward of the shafts 210 and closer to the centerline 404. By utilizing the offset arrangement of the shaft 210-cam 208 coupling, the force generated by the motors 218 is substantially larger at the end of line portion 402a than in arrangements with shafts 210 coupled to cams 208 at centers thereof. Therefore, a smaller motor 218 may be used to actuate the piston 102 due to the mechanical advantage provided by the cams 208. The embodiments herein are not limited to cam-belt mechanisms. Other mechanisms to increase the moment arm about the shaft, such as pushrods or lever arms, are also contemplated. Still further, gears may also be utilized herein.

A full cycle of the piston 102 of FIG. 3A will now be described in reference to FIGS. 4A and 4B. In FIG. 4A, the piston 102 is at the starting, neutral position at the top of the stroke. The head 204 is at a maximum distance away from the base 202 at a starting position 406. Similarly, piston head 318 of the vacuum piston 216 is at a starting position 408, which is a maximum distance from the enclosed end of the cylinder 320. Cams 208 are shown with line segments 402a disposed away from the centerline 404. In order to actuate the piston 102, a controller (not shown) synchronously activates the motors 218 and the vacuum source 322. As discussed above, the vacuum source 322 evacuates the volume 326 to bias the piston head 318 towards the enclosed end of the cylinder 320, herein representatively referred to as upward. The upward bias of the piston head 318 induces a tension onto the belts 214 coupled thereto. Similarly, the torque generated by the motors 218 on the shafts 210 is transferred by the cams 208 to the belts 214. Synchronously, the cams 208 rotate about the shafts 210 while the piston head 318 moves upward. Accordingly, the head 204 is urged in a direction 414 towards the base 202, herein representatively downward, by the tension in the belts 214. The cams 208 and piston head 318 continue their respective motions until the head 204 reaches the bottom of the stroke, shown in FIG. 4B. As discussed previously, the motion of the head 204 compresses gases within the internal volume 300. At the start of the compressive stroke, the force needed to move the head 204 is at minimum, and increases as the head travels toward its maximum compression position at the bottom of the stroke.

In FIG. 4B, the piston 102 is shown at the bottom of the stroke in a fully compressed position. Head 204 is located at a distance from the base 202 here substantially less than the distance from the starting position 406. In this positon, the distance between the head 204 and the base 202 is minimized. Similarly, piston head 318 is located substantially closer to the enclosed end of the cylinder 320 than at the starting position 408. Additionally, at the bottom of the stroke, the inner volume 300, as well as the volume 326, is minimized. Further, the cams 208 are rotated 180 degrees from their starting positions 410 (shown in phantom) and line segments 402a are disposed towards the centerline 404. At the bottom of the stroke, the energy stored within the piston 102 due to the compressed gas therein is greatest. In order to generate a wave, the controller (not shown) synchronously disengages the vacuum source 322 and the motors 218. The stored energy within the piston 102 is translated into kinetic energy in the movement of the head 204. The pressure differential across the head 204 urges the head 204 away from the base 202 in a direction 412, herein representatively upward. The head 204 displaces a portion of the fluid surrounding the piston 102 as the head 204 moves from the bottom of the stroke (FIG. 4B) to the top of the stroke (FIG. 4A) in a rapid manner. The head 204 continues along the direction 412 until reaching the neutral starting positon at the top of the stroke (FIG. 4A). The cycle of compressing the piston 102 can then be repeated as many times as desired to generate successive waves. The repeated actuation of the piston 102 produces waves to conduct seismic surveys.

The piston 152 of FIG. 3B is actuated in a manner similar to that of piston 102 of FIG. 3A. Rather than the motors 218 applying a force onto the shaft 210 as in FIG. 3A, the motors 218 apply a force directly between the head 204 and the base 202. As such, the vacuum source 322 is synchronously activated with the motors 218 in order to actuate the piston 102. The force applied by the motors 218 onto the head 204 lessens the force required to be generated by the vacuum piston 216. Thus, the vacuum piston 216 and the motors 218 work in conjunction to actuate the piston 152.

One of ordinary skill in the art will understand that the piston 102 may be stroked in other operations, such as by other types of drivers. For example, the piston 102 may be stroked by operating just the motors 218. Similarly, the vacuum pistons 216 may be used alone to actuate the piston 102. Still further, a sequential operation of the motors 218 and the vacuum pistons 216 may be used. Any order of activating and deactivating the motors 218 and vacuum pistons 216 capable of stroking the piston 102 may be used.

As understood by one of ordinary skill in the art, it is desirable to operate a vibration source in resonance which maximizes the amplitude of the wave signal. Additionally, the energy transfer between the marine vibrator and the fluid medium is also increased by operating in a resonance state. In conventional marine vibrators, a mechanical spring is used to tune the marine vibrator to the frequency and operate the marine vibrator in resonance. However, mechanical springs define small, usually fixed, ranges of tuning capability which limits the bandwidth wherein the marine vibrator can operate in resonance.

Returning to FIGS. 3A and 3B, the pistons 102, 152 have resonance springs 220 used to tune each piston 102, 152 in order to operate the marine vibrator assembly 100 (FIG. 1) in resonance. The resonance spring 220 is coupled at a first end to the base 202. At the opposing end, the resonance spring 220 is coupled to the head 204. In certain embodiments, the head 204 and resonance spring 220 is coupled by a pin. In other embodiments, the resonance spring 220 is coupled by welding. Any method of coupling the resonance spring 220 to a body, such as the head 204 or the base 202, may be utilized. As each piston 102, 152 is actuated, the resonance spring 220 applies a calculated dampening effect to the head 204 thereby allowing each piston 102, 152, and thereby the marine vibrator assembly 100, to operate in resonance.

Figure 5:
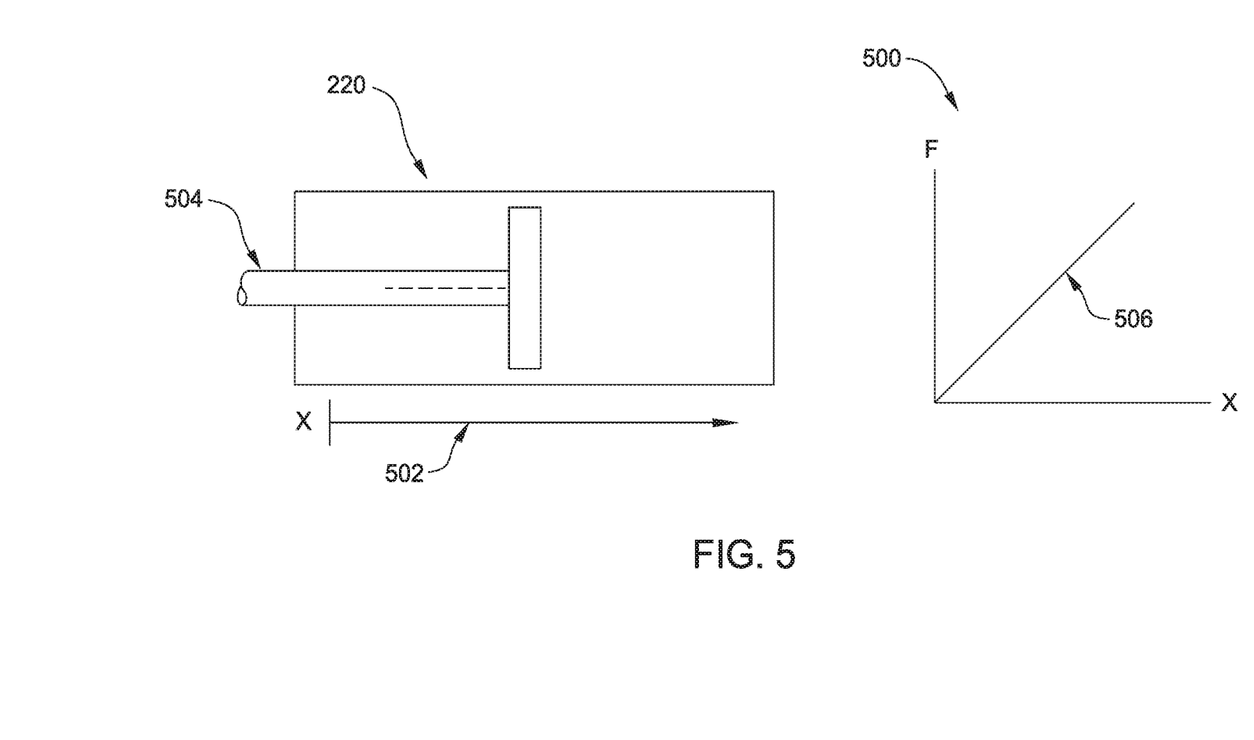
FIG. 5 is a graphical representation of an exemplary resonance spring.

The resonance spring 220, in particular the spring constant thereof, is adapted based on the operating frequency and a vibrating mass using known principles of the system dynamics to maximize decibel output of each piston 102, 152. In the embodiments herein, an air spring is used to form the resonance spring 220. FIG. 5 is schematic of an air spring, such as resonance spring 220, and a graphic representation of force generated thereby. The air spring utilized herein advantageously has an approximately linear spring force. As a distance 502 increases, which is the travel distance of the spring piston 504, the force applied by the spring also increases in a linear relationship. The relationship of force generated by the spring versus the travel distance 502 of the piston is shown in graph 500. The force, represented by line 506, increases in a linear fashion as the distance 502, here the x axis, increases. The resonance spring 220 can be easily adjusted to adapt to a wide range of operation frequencies since the relationship between the force and distance is predictably known. Use of an air spring provides a much larger range of resonant frequencies than a conventional spring because the spring constant can be adjusted.

Adjusting the spring constant of the resonance spring 220 adjusts the resonant frequency of each piston 102, 152. The spring constant is the relationship between the force generated by the spring and the compression distance of the spring. Adjusting the spring constant increases or decreases the force applied by the spring over a given displacement distance. With the resonance spring 220 as utilized here, this is easily done by increasing or decreasing the gas pressure within the spring. The resonance spring 220 is optionally coupled to a controller and gas supply. The controller (not shown) may select a desired resonant frequency of each piston 102, 152 and supply or remove a gas, such as from auxiliary tanks 106, to adjust the resonance spring 220 in order to operate the marine vibrator assembly 100 in resonance. In certain embodiments, the resonance spring 220 may be adapted to a single frequency. In further embodiments, the resonance spring 220 may adapt to multiple frequencies. In still further embodiments, the resonance spring 220 may be continuously adjusted based on a frequency profile. The frequency profile may have a varying range of frequencies, for example from 1 Hz to 25 Hz, in linear or non-linear relationship. These profiles are commonly known in the art as chirps. By adjusting the spring constant of the resonance spring 220 as described herein, the marine vibrator assembly 100 may operate in resonance across a wide range of continuously varying frequencies.

Figure 6:
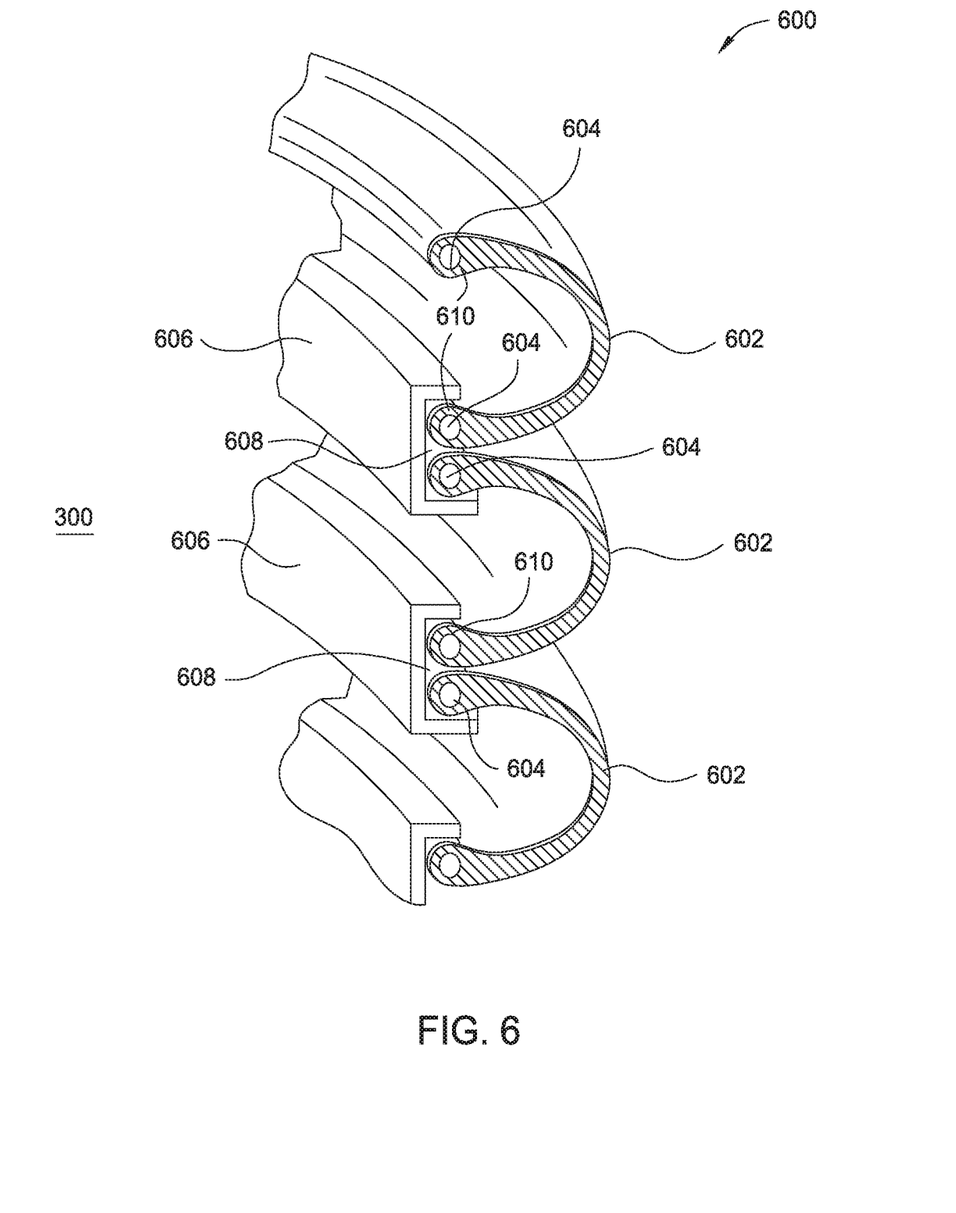
FIG. 6 is a schematic arrangement of an exemplary seal according to certain embodiments.

FIG. 6 is a partial cross-section of an exemplary seal according to certain embodiments. The seal 600, which may be used as seal 206 of FIG. 2 and FIG. 3, has a series of annular sealing members 602. Here, the sealing members 602 have an arcuate cross section. The sealing members 602 are generally formed from a flexible material which can withstand the oscillations of each piston 102, 152. Additionally, the material may be selected to minimize or prevent deterioration from the operating environment. Some exemplary materials include rubber, composites, or petroleum based polymers such as polytetrafluoroethylene (PTFE). The arcuate portions are generally configured to face outward (away from the internal volume 300) since each piston 102, 152 is generally operated with a greater pressure in the internal volume 300 than the pressure in the external environment.

Annular strength members 604 are disposed within the sealing members 602 at ends 610. The strength members 604 are adapted to withstand radial load due to the pressures on the seal 206 generated by the compressed gases within the internal volume 300. The strength members 604 may be formed from any material capable of withstanding the stresses induced by the operation of each piston 102, 152. In certain embodiments, the strength members 604 is metal cable. Other exemplary strength members 604 include metallic wire, polymer filament, or composite woven fibers. In still further embodiments, the ends 610 may be designed to function as the structural support without strength members 604.

Coupling members 606 are disposed within the inner circumference of the seal 600 at the junction between pairs of sealing members 602. The coupling members 606 function to adjoin ends 610 of one sealing member 602 to an adjacent sealing member 602. The coupling members 606 may be any apparatus or method capable of coupling and sealing the ends 610. In the embodiment shown in FIG. 6, the coupling member includes a metallic band compressed against the ends 610. The band has a first planar member having an inner surface (towards the inner volume 300) and an outer surface (towards the sealing members 602). Two extensions are disposed at opposing ends of the planar member and extend outwardly from the outer surface. Ends 610 are inserted between the opposing extensions and press against the outer surface of the planar member. The extensions are "crimped" against the ends 610 in order to form a structural joint between the sealing members 602 and the coupling member 606. A sealing medium 608 is optionally disposed between the coupling member 606 and the sealing members 602. The sealing medium 608 may be, for example, a fluid compound such as flowable rubber. The sealing member 602-coupling member 606 joint may further be vulcanized to create a fused juncture between the coupling member 606, sealing members 602, and sealing medium 608. Vulcanizing also creates a chemical seal to prevent fugitive leaks through the joint 608. In other embodiments, the coupling member 606 is a sewn juncture. In still further embodiments, the coupling member 606 is a bonded joint. Any method capable of joining the sealing members 602 may be utilized. In certain embodiments, the sealing member 602 is a bicycle tire structure.

The seal of FIG. 6 advantageously increases the life of the seal. In a conventional seal design, which utilizes a single unitary element, the single member absorbs the entire motion of the coupled body. This creates a large distance the seal travels thereby inducing a high fatigue onto the seal. By utilizing multiple sealing members, such as in the seal design of FIG. 6, each sealing members absorbs only a small portion of the motion of the coupled body. Therefore, the fatigue experienced by each member is greatly reduced. By selectively increasing the number of sealing members, the fatigue experienced by each is proportionally reduced thereby advantageously increasing the life of the sealing members.

Figure 7:
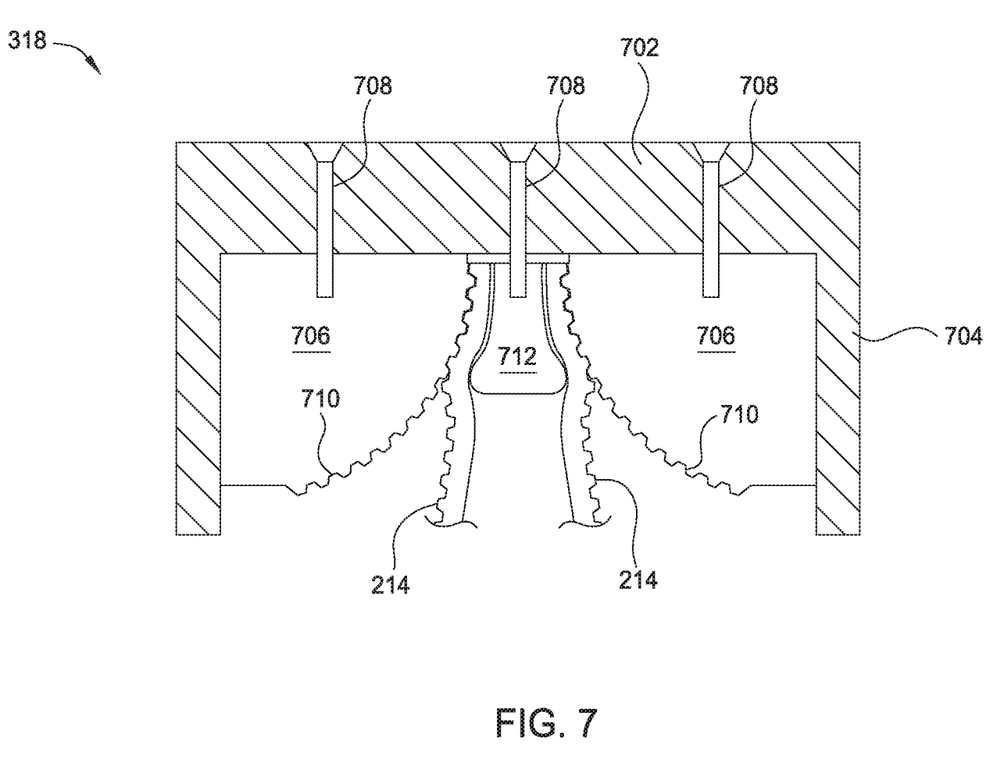
FIG. 7 is an exemplary belt connection joint according to certain embodiments.

FIG. 7 is a cross-section of an exemplary belt connection joint. Here, piston head 318 is shown in cross-section. The piston head 318 has a disc-like bearing member 702 having an upper surface and a lower surface. A cylindrical skirt 704 extends from the bearing member 702 at the lower surface. Semicircular gripping plates 706 are disposed within the cylindrical skirt 704 opposing one another. The gripping plates 706 may be unitary with the piston head 318 or separate bodies coupled thereto. In certain embodiments, the gripping plates 706 are coupled to the piston head 318 by threaded fasteners 708 but other means of coupling the gripping plates 706 to the piston head 318 are contemplated. A plurality of teeth 710 is disposed about the gripping plates 706 at an outer arc thereof. Belts 214, comprising toothed belts in this embodiment, are mated to the gripping plates 706 such that the teeth 710 engage teeth disposed within the surface of the belts 214. A biasing member 712 is disposed between opposing gripping plates 706 and further between the belts 214. The biasing member 712 functions to engage the teeth of the belts 214 and the teeth 710 of gripping plates 706. In certain embodiments, the biasing member 712 has lobes, as shown in FIG. 7, to further engage the gripping plates 706 and belts 214. The biasing member 712 creates a constant angle of attachment for the belts 214 thereby minimizing fatigue at the attachment points caused by stroking of the vacuum piston 318. The biasing member 712 may be coupled to the piston head 318 by threaded fasteners 708 but other coupling methods are contemplated. The exemplary belt connection joint of FIG. 7 is designed to withstand the large forces induced on the belt 214 during operation of the piston 102. However, other connection types are contemplated. For example, the belts 214 may be coupled to a body by flanges. In still further embodiments, the belts 214 may be bonded to a mating body. It should be noted that the connections discussed herein may be used at any coupling location for the belts 214, such as connection points 334 on the head 204 (FIG. 3).

Figure 8:
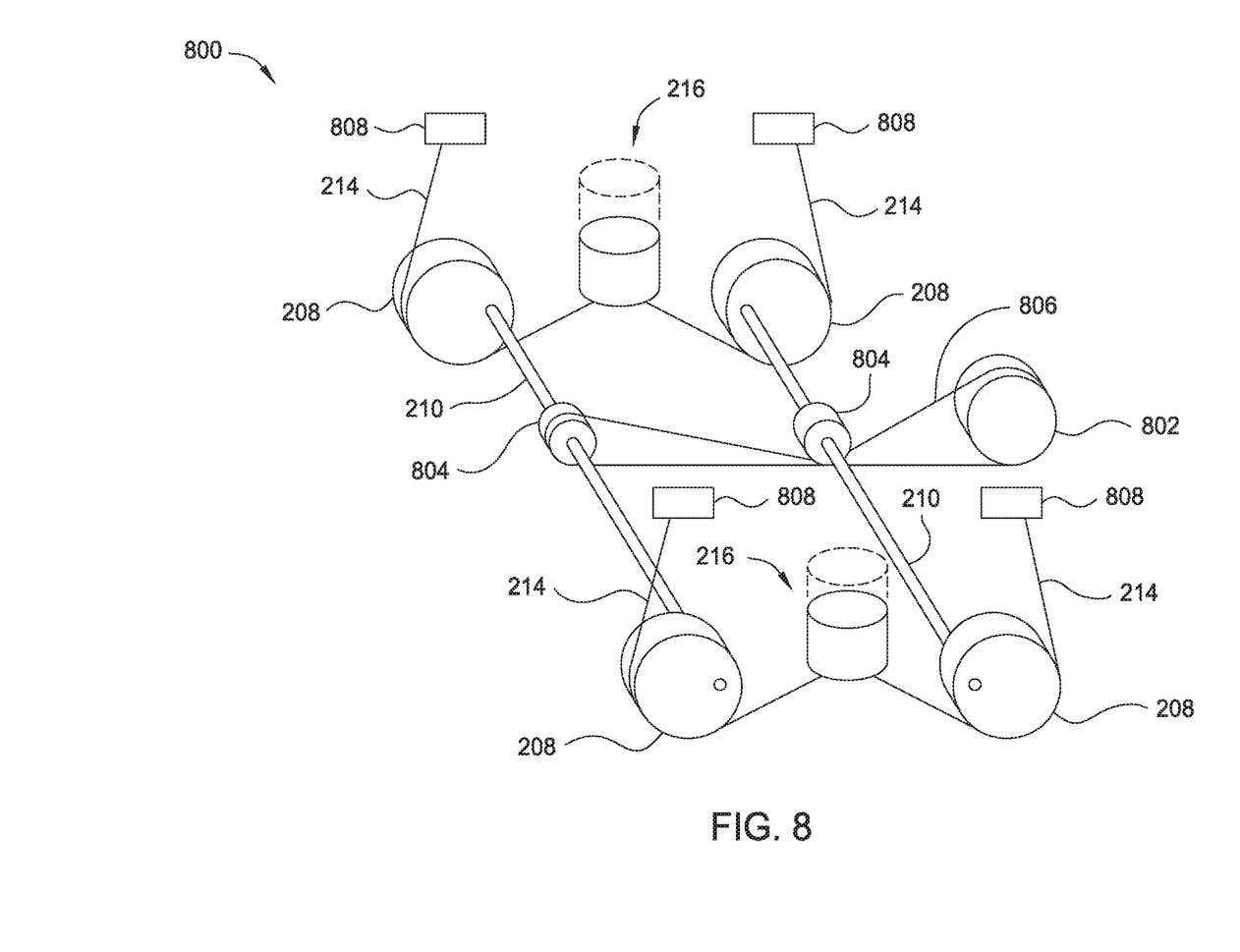
FIG. 8 is an exemplary arrangement of a synchronization mechanism according to certain embodiments.

FIG. 8 is an exemplary synchronization system for use with pistons 102, 152. The synchronization system 800 has a single motor (not shown) coupled to a drive wheel 802. The drive wheel 802 is coupled to rotation wheels 804, each coupled to a shaft 210, by drive belt 806. The drive wheel 802 rotates about an axis and provides rotational motion to the rotation wheels 804 through the drive belt 806. The rotation wheels 804, in turn, rotate the shafts 210 and cams 208 coupled thereto at each end. Similar to the operation described in FIG. 4A and 4B, the cams 208 provide a tension to the belts 214 to compresses the head 204 (FIG. 3). In FIG. 8, the head 204 is not shown so the relationships among components of the synchronization system 800 can be understood. Each belt terminates at a block 808 which represents a connection of the end of the belt 214 coupled to the head 204, such as at connection points 334 (FIG. 3). Vacuum pistons 216 are again coupled to the opposed ends of the belts 214 opposite of the blocks 808 (connection points 334). A controller (not shown) synchronously engages the drive wheel 802 and the vacuum piston 216 in order to move the head 204 and compress each piston 102, 152.

FIG. 8 discloses an exemplary synchronization system concept for use with the embodiments herein. However, other synchronization systems may be used. For example, a controller (not shown) may be coupled to the motors 218 (FIG. 3), vacuum source 322 (FIG. 3), and the resonance springs 220 to control the individual components. Further, one control system may be utilized for multiple pistons 102, 152. It is also contemplated that a different number of drive mechanisms may be utilized. For example, an arrangement of pistons 102, 152, such as that of FIG. 1, may be driven by centrally located shafts. In such an exemplary configuration, the cams 208 of separate pistons 102, 152 may be coupled along a shared shaft 210 driven by a single motor 218 in order to minimize the number of motors 218 required to operate the marine vibrator. Any arrangement of controller and drive may be utilized herewith to synchronize the operations of a single piston or multiple pistons together.

The embodiments described herein advantageously increase the life of a marine vibrator. By utilizing the novel actuation means, the components have increased reliability and operable life. Additionally, the system has a more simple, compact design than conventional marine vibrators and is further capable of tuning to a larger range of frequencies for resonant operation. Therefore, the embodiments herein provide a marine vibrator capable of producing wave for seismic surveying while increasing the reliability.

While the foregoing is directed to embodiments of the present disclosure, other and further embodiments of the disclosure may be devised without departing from the basic scope thereof, and the scope thereof is determined by the claims that follow.

What is claimed is:

1. A displacement apparatus, comprising:
   a base plate;
   an actuated head;
   a flexible seal disposed between the base plate and the actuated head to define an internal volume; and
   an actuation mechanism disposed within the internal volume, the actuation mechanism comprising:
      a shaft;
      a plurality of cams coupled to the shaft, wherein each cam is coupled to the shaft at a location displaced from the center of the cam;
      a transfer member coupled to the one or more cams and the actuated head; and
      a driver that moves the actuated head.

2. The displacement apparatus of claim 1, wherein the transfer member has a first end coupled to the actuated head and a second end opposite the first end, and the actuation mechanism further comprises a vacuum piston coupled to the transfer member at the second end.

3. The displacement apparatus of claim 1, wherein the flexible seal comprises:
   a plurality of annular sealing members, each having one or more strength members disposed therein; and
   one or more coupling members coupled to the plurality of annular sealing members.

4. The displacement apparatus of claim 3, wherein each coupling member joins two of the annular sealing members.

5. The displacement apparatus of claim 1, further comprising one or more adjustable resonance springs disposed between the base plate and the actuated head, each spring adapted to tune to an operating frequency of the displacement apparatus.

6. The displacement apparatus of claim 5, wherein the one or more adjustable resonance springs are air springs.

7. The displacement apparatus of claim 1, wherein the driver is a linear motor.

8. The displacement apparatus of claim 1, wherein the driver is a vacuum cylinder.

9. The displacement apparatus of claim 1, wherein the driver is a combination of a vacuum cylinder and a motor.

10. The displacement apparatus of claim 1, wherein the internal volume is an airtight volume.

11. A marine vibrator, comprising:
a support frame;
an auxiliary tank coupled to the support frame; and
a plurality of pistons coupled to the support frame, wherein each piston comprises:
an actuated head; and
a cam assembly.

12. The marine vibrator of claim 11, wherein the each piston further comprises a seal, the seal comprising:
a plurality of annular sealing members having strength members disposed therein; and
one or more coupling members coupled to the plurality of annular sealing members.

13. The marine vibrator of claim 11, wherein each piston further comprises one or more adjustable resonance springs adapted to tune to an operating frequency.

14. The marine vibrator of claim 13, wherein the one or more adjustable resonance springs are air springs.

15. The marine vibrator of claim 11, wherein the plurality of pistons receive a gas from the auxiliary tank.

16. The marine vibrator of claim 11, wherein an internal volume of each piston is adapted to maintain a pressure therein greater than a pressure outside of the internal volume.

17. A system for generating a wave, comprising:
a plurality of oscillators, each oscillator comprising a head; and
a controller coupled to the plurality of oscillators, wherein the controller selectively operates a vacuum piston and a motor disposed within each oscillator to displace the head of each oscillator.

18. The system of claim 17, wherein the displacement of each head displaces a fluid to generate a wave.

19. The system of claim 17, further comprising a resonance spring disposed within each oscillator tuned to generate the wave in a resonance state.

20. The system of claim 19, wherein the resonance spring is an air spring coupled to the controller.

21. The displacement apparatus of claim 1, wherein the transfer members comprise a toothed belt, a cable, a chain, or a combination thereof.

* * * * *